May 23, 1961   R. G. HIBBARD ET AL   2,985,208
DEVICE FOR HOLDING SCREWS, BOLTS AND THE LIKE

Filed July 23, 1954   2 Sheets-Sheet 1

INVENTORS.
Rowland G. Hibbard
Franklin B. Berry
BY: Horace B. Van Valkenburgh
ATTORNEY May 23, 1961     R. G. HIBBARD ET AL     2,985,208
DEVICE FOR HOLDING SCREWS, BOLTS AND THE LIKE
Filed July 23, 1954     2 Sheets-Sheet 2

INVENTOR.
Rowland G. Hibbard
Franklin B. Berry
BY
*Horace B. Van Valkenburgh*
ATTORNEY

United States Patent Office 2,985,208
Patented May 23, 1961

2,985,208
DEVICE FOR HOLDING SCREWS, BOLTS AND THE LIKE
Rowland G. Hibbard, 320 Broadwater Ave., Billings, Mont., and Franklin B. Berry, 314 Broadwater Ave., Billings, Mont.
Filed July 23, 1954, Ser. No. 445,408
5 Claims. (Cl. 145—50)

This invention relates to devices for holding screws, bolts, nuts and the like.

In using a screw driver, either of the flat blade type or of the serrated blade type (the latter also being known as "Phillips" screw driver), it often happens that the operator is working in cramped quarters or in an inconvenient position so that the tendency to drop or misplace a screw is great. Also, in many work locations, it is often difficult and sometimes nearly impossible to retrieve a screw which has been dropped. Furthermore, the necessity for fumbling around in a pocket or the like to find a screw to be placed in a particular position requires one hand at least to be disengaged from the work. This often causes considerable inconvenience, particularly when a part or parts must be held in position with one hand while the screw driver is being operated with the other hand.

Prior screw holding devices, particularly for use with screw drivers, have included the magnetization of the tip of the screw driver, so as to hold the screw by magnetic attraction, but such screw drivers are unsatisfactory when the screw it self is made of non-magnetic material, such as brass. Also, screw drivers have been provided with an assembly which slides along the blade and which includes a pair of prongs having inwardly extending fingers at the ends and formed of spring material, so as to engage the underside of the screw head and pull it toward the screw driver tip. While somewhat clumsy in use, these are certainly much better than nothing at all, but often involve loss of time and difficulties in removing one screw, for instance, and replacing it with another, since the replacement screw cannot be carried on the screw driver but is usually carried in the pocket or in some sort of receptacle.

In "spotting" bolts, nuts and screws in relatively inaccessible places, particularly those which cannot be reached by hand, workmen have attached a wire or rod, as by soldering or welding, to the head of the bolt or screw so that it may be placed in position so that the nut can be attached thereto, either by the same or another workman. Sometimes such wires or rod can be removed, at least partially, by twisting or breaking off the wire or rod after the nut has been tightened on the bolt or screw, but often the wire or rod is merely left in place, particularly if it would not tend to interfere with the operation of the machine or construction which is being assembled. However, the soldering or welding operation which is necessary to attach the wire or rod to the bolt or screw requires the time of a workman, or the time of another workman if the workman installing the bolt or screw does not belong to the proper union, and also ties up the soldering or welding equipment for a period of time.

Among the objects of the present invention are to provide a novel holding device for screws and the like; to provide such a holding device which is adapted particularly to be utilized in connection with a screw driver; to provide such a device which can be used with a screw driver having a flat blade or having a serrated or fluted blade; to provide such a device which will hold a screw head in engagement with the tip of a screw driver while placing or removing a screw; to provide such a device in which a screw can be placed prior to the need therefor and can also be supported in a position readily convenient for use; to provide such a holding device which is particularly adapted to be utilized in spotting a bolt, screw or nut by means of a wire or rod; to provide such a holding device which may be made in several different forms or embodiments; to provide such a holding device which is relatively simple in construction and may be made of inexpensive material; and to provide such a screw holding device which is highly effective and convenient in operation.

Additional objects and the novel features of this invention will become apparent from the description which follows, taken in connection with the accompanying drawings, in which.

Figure 5:
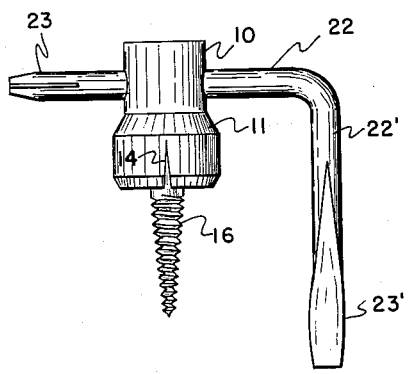
Fig. 5 is a side elevation of the holding device of Fig. 1 mounted on an angle screw driver, holding a screw in a convenient position prior to use.

As illustrated in Figs. 1–4, a holding device constructed in accordance with this invention may comprise a body or plug of rubber or other resilient material, preferably formed of stretchy rubber or similar material, having a generally cylindrical body 10 with an enlargement 11 at its lower end and provided with a longitudinal hole 12 extending from the upper end to a recess 13 adjacent the lower end and contained within the body enlargement 11. The recess 13 may be substantially spherical in shape, except where the hole 12 passes therethrough. In addition, the body enlargement 11 is provided with a series of longitudinally extending slits 14, and an end hole 15, preferably smaller than hole 12 so that a screw 16 having a head 17 may be gripped securely therein. Slits 14 extend upwardly from the lower end to a sufficient distance that head 17 of screw 16 may be inserted therein, as in Figs. 5–7, to grip the screw head. As will be evident from Fig. 7, the shank 20 of a screw driver may be inserted through the longitudinal hole 12 so that blade 21 will engage the screw head 17. The hole 12 preferably has a diameter equal to or slightly less than the diameter of the screw driver shank, so that, as in Fig. 8, the shank 20 of the screw driver may be inserted in the hole 12 and the edges of flat blade 21 will be gripped, to maintain the screw driver and the screw head in engagement. The screw driver shown in Figs. 6, 7 and 8 may be provided with a conventional handle, while the screw driver illustrated in Fig. 5 is an angle screw driver having shanks 22 and 22' at right angles to each other so that either may be used as a handle for the other, the shank 22 being provided with a conventional fluted blade 23 and the shank 22' being provided with a conventional flat blade 23'.

Figure 2:
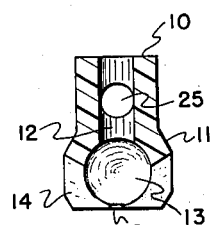
Fig. 2 is a longitudinal section of the holding device of Fig. 1.
Figure 7:
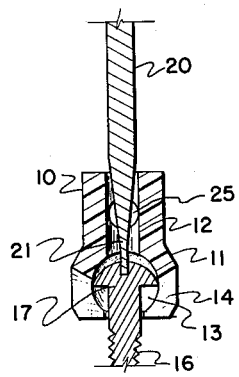
Fig. 7 is a fragmentary, longitudinal section taken along line 7—7 of Fig. 6.
Figure 1:
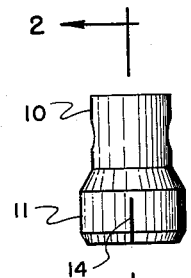
Fig. 1 is a side elevation of a holding device constructed in accordance with this invention.
Figure 8:
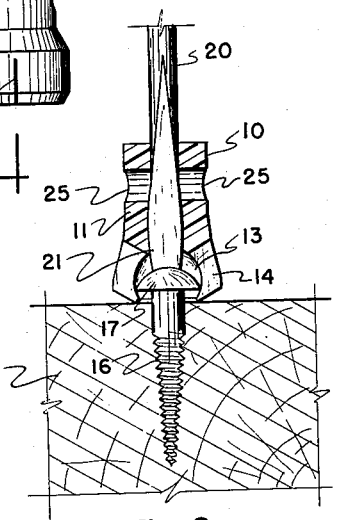
Fig. 8 is a longitudinal section, taken transversely to Fig. 7, illustrating the action of the holding device as a screw is driven into an article, such as wood.
Figure 3:
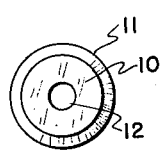
Fig. 3 is a top plan view of the same.
Figure 4:
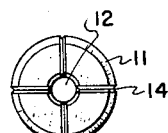
Fig. 4 is a bottom plan view of the same.

In further accordance with this invention, and as shown in Figs. 2 and 8, the body 10 is also provided with a transverse hole 25 extending therethrough at right angles to and intersecting the longitudinal hole 12, the hole 25 preferably having substantially the same diameter as the hole 12. Thus, a screw driver shank, such as the shank 22 of Fig. 5, may be inserted into and through the transverse hole 25 so that the holding device is mounted on the screw driver in a position which permits a screw to be held by the device in a position in which the screw driver shank may be readily slipped from the lateral hole 25 and into the longitudinal hole 12, i.e., to the position of Figs. 6 and 7. Thus, the screw to be used next may be carried on the shank of the screw driver, as in the manner illustrated in Fig. 5, so that it may be utilized at any time without the inconvenience of the operator having to search in a pocket or receptacle for the next screw.

Figure 6:
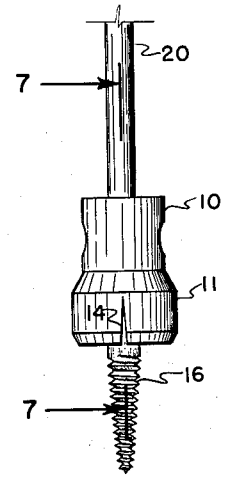
Fig. 6 is a side elevation of the holding device and screw of Fig. 5, mounted on the tip of a screw driver in position for driving the screw, as into a piece of wood.
Figure 9:
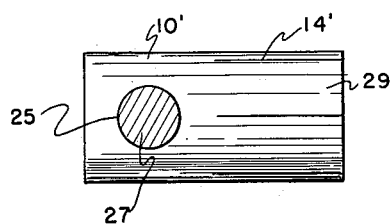
Fig. 9 is a side elevation of a holding device constructed in accordance with this invention and forming an additional embodiment thereof.
Figure 10:
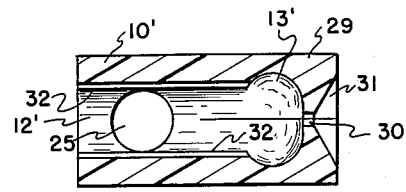
Fig. 10 is a longitudinal section of the device of Fig. 9.

In addition, the holding device of this invention may be utilized in spotting a nut, bolt or screw in an inaccessible position, such as when inserting a bolt or screw through a hole adapted to receive the same, so that the nut may be tightened onto the bolt or screw, or holding a nut in a relatively inaccessible position so that a bolt or screw may be threaded therein. This is accomplished by placing a machine screw or bolt in the device in the same manner as illustrated in Figs 5–7, with respect to a wood screw, or placing a nut therein in a similar manner with the face of the nut flush with or extending slightly from the end of the device, and, as in Fig. 9, inserting the end of a wire or rod through the lateral hole 25, the wire or rod preferably having a diameter such that it fits snugly in the hole 25 so that it is securely attached to the device. As will be evident, the wire or rod may be easily utilized in spotting a bolt, screw or nut, i.e., placing a bolt or screw in the hole prepared to receive the same so that the bolt or nut may be attached thereto, or placing a nut in position over a hole through which a bolt or screw has been or is to be inserted. As will be evident, as the nut is tightened on the bolt or screw, the head thereof will tend to be pulled out of the device, similar to the manner illustrated in Fig. 8. Similarly, when a nut is held by the device, the nut tends to be pulled out of the device and the device may easily be pulled off the nut by the wire or nut after the screw or bolt engaging the same is tightened. Thus, in effect, the bolt or screw is disengaged from the device automatically when the nut is tightened thereon, or vice versa. Also, the device may be recovered readily, since it is still attached to the wire or rod. The wire or rod may be left attached to the device if a number of bolts, screws or nuts are to be spotted in this manner, or the wire or rod may be removed so that the device may be utilized with a screw driver in the manner described previously.

In the event that a spotting wire or rod, welded or soldered to a screw or bolt head, or a nut, accidentally comes in contact with an electrical conductor, there may be danger of a short to ground, or of electricity being transmitted to the workman attaching the nut to the bolt or screw. However, the device of this invention separates the wire or rod from the screw or nut held therein, since the lateral hole 25 is spaced from the head of the screw or the nut and the rubber of the device prevents current from being conducted to the bolt or screw.

Figure 13:
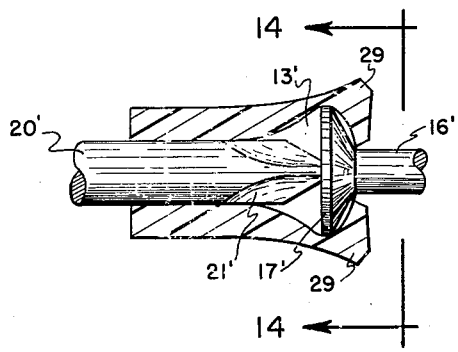
Fig. 13 is a longitudinal section similar to Fig. 10 but illustrating the device of Fig. 9 in use.
Figure 14:
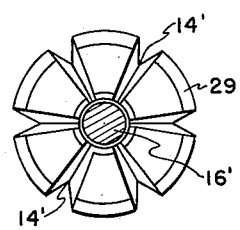
Fig. 14 is a cross section taken along line 14—14 of Fig. 13.
Figure 11:
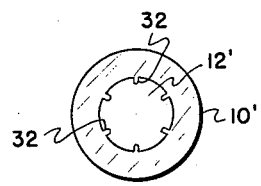
Fig. 11 is a plan view looking in the direction of one end of the device of Fig. 9.
Figure 12:
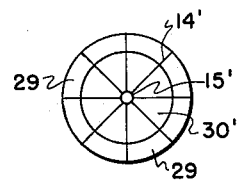
Fig. 12 is a plan view looking in the direction of the opposite end of the device of Fig. 9.

In the embodiment of this invention illustrated in Figs. 9–14, the body 10' is tubular and is provided with a longitudinal hole 12' which extends to a recess 13' which may be transversely oval in shape, i.e., having generally the shape of a sphere flattened at the poles. A transverse or lateral hole 25 extends through the body adjacent one end, as before, while an end hole 30 beyond recess 13', i.e., at the end opposite transverse hole 25, is relatively small so that a secure grip will be obtained on relatively small screw heads. This end of the body may also be provided with a series of slits 14' which form jaws therebetween, which are spread apart when a head 17' of a screw 16' is inserted in the recess 13', as in Figs. 13 and 14. In addition, an inwardly tapering counterbore, formed by a conical surface 31, may extend inwardly to hole 30, so that the end of the device will be substantially flat, as illustrated in Fig. 13, when the jaws formed between the slits 14' are spread apart by insertion of the head of the screw in recess 13'. The device of Figs. 9–14 is adapted to be utilized in the manner described previously, such as by insertion of the shank 20' of a screw driver into the longitudinal hole 12', so that the blade 21' will engage the head 17' of screw 16'. Also, the longitudinal hole 12' may be provided with a series of ribs or fins 32 which extend longitudinally of the bore of hole 12', as in Figs. 10 and 11. The ribs 32 are adapted to grip a smaller screw driver shank and are also forced to the side when a larger screw driver shank is inserted in the hole 12', thus causing the device to be held securely to the screw driver for a variation of shank sizes.

Figure 15:
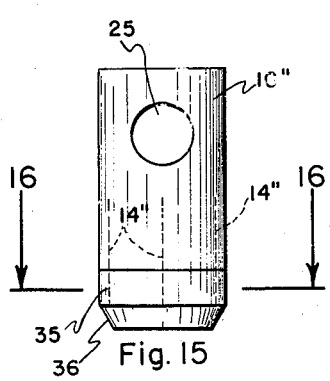
Fig. 15 is a side view of a holding device constructed in accordance with this invention and forming a further embodiment thereof.
Figure 16:
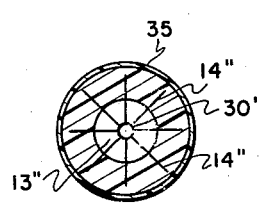
Fig. 16 is a cross section taken along line 16—16 of Fig. 15.

In the embodiment of this invention illustrated in Figs. 15 and 16, the body 10" may be similar to the body 10' of Figs. 9–14, except that eight circumferentially spaced slits 14" may extend outwardly in the body on the inside of hole 30' and recess 13", these slits extending only partially through the body, although they may extend completely through, if desired. This embodiment may be made of less live rubber than the embodiments previously described, such as reclaimed rubber, and a band 35 of live, stretchy rubber is placed around the end of the body 10' within a recess provided for that purpose, preferably adjacent or spaced slightly from the forward end of recess 13'. Also, the end of the body 10" may be tapered, as at 36. The band 35 produces a secure grip on screw heads inserted in the recess 13" and may be attached at one or more points around the periphery of the body. As will be evident, if any of the other embodiments are made of less live rubber, such a band may be provided therefor.

From the foregoing, it will be evident that the holding device of this invention fulfills to a marked degree the requirements and objects hereinbefore set forth. The device is particularly adapted to be utilized for holding a screw in engagement with a screw driver blade while the screw is being fastened or tightened. In addition, the holder may be utilized to hold a screw in a convenient position prior to use of the device, or may be utilized in association with a wire or rod for spotting a screw or bolt in a relatively inaccessible position. The device is readily detachable from the screw driver and the wire or rod, and therefore need not be left in place.

Although several different forms of the invention have been illustrated and described, it will be understood that variations may be made therein. Thus, the material may differ; the shape of the recess which engages the head of the screw may be altered; and the number and lateral extent of the slits which cooperate to provide a gripping action on the screw head may be varied. While the device is preferably made of a live, snappy rubber, if less live rubber is uitlized, a live, stretchy band may be placed around the lower end of the device. It will further be understood that other embodiments may exist and various other changes may be made, all without departing from the spirit and scope of this invention.

What is claimed is:

1. A device for holding screws and the like, comprising a cylindrical body of resilient material having a longitudinal hole therethrough, said hole being enlarged adjacent one end of said body to form a generally spherical recess for receiving the head of a screw and the like and said longitudinal hole being smaller in diameter between said recess and said one end than between said recess and the opposite end of said body; and said body having a series of circumferentially spaced, longitudinally extending slits forming jaws therebetween for gripping the head of a screw and the like, said slits extending from said one end of said body to a point past said recess.

2. A device for holding screws and the like, comprising a body of resilient material having a longitudinal hole herethrough, said hole being enlarged adjacent one end of said body to form a recess for receiving the head of a screw and the like and said longitudinal hole being smaller in diameter between said recess and the adjacent end of said body than between said recess and the opposite end of said body, said body having a series of circumferentially spaced, longitudinatly extending slits at said one end and said one end of said body being provided with a concave, conical surface extending to said longitudinal hole.

3. A device for holding screws and the like, comprising a body of resilient material having a longitudinal hole therethrough, said hole being enlarged adjacent one end of said body to form a recess for receiving the head of a screw and the like, said recess having generally the shape of a sphere having flattened poles without a screw head therein.

4. A device for holding screws and the like, comprising a cylindrical body of resilient material having a longitudinal hole therethrough, said hole being enlarged adjacent one end of said body to form a recess having generally the shape of a sphere with flattened poles for receiving the head of a screw and the like and said longitudinal hole being smaller in diameter between said recess and said one end than between said recess and the opposite end of said body; said one end of said body being provided with a concave, conical surface extending to said longitudinal hole; said body having a series of circumferentially spaced, longitudinally extending slits forming jaws therebetween for gripping the head of a screw and the like, said slits extending from said one end of said body to a point past said recess; and said longitudinal hole being provided with a series of circumferentially spaced, longitudinal ribs extending inwardly in said longitudinal hole between said recess and said opposite end of said body.

5. A device for holding screws and the like, comprising a cylindrical body of resilient material having a longitudinal hole therethrough, said hole being enlarged adjacent one end of said body to form a recess having generally the shape of a sphere with flattened poles for receiving the head of a screw and the like and said longitudinal hole being smaller in diameter between said recess and said one end than between said recess and the opposite end of said body; said one end of said body being provided with a concave, conical surface extending to said longitudinal hole; and said body having a series of circumferentially spaced, longitudinally extending slits forming jaws therebetween for gripping the head of a screw and the like, said slits extending from said one end of said body to a point past said recess.

References Cited in the file of this patent

UNITED STATES PATENTS

| | | |
|---|---|---|
| 729,830 | Yates | June 2, 1903 |
| 1,360,500 | Coll | Nov. 30, 1920 |
| 1,504,035 | Faw | Aug. 5, 1924 |
| 1,889,330 | Hines et al. | Nov. 29, 1932 |
| 2,618,986 | Hungerford | Nov. 25, 1952 |
| 2,701,491 | Ross | Feb. 8, 1955 |
| 2,723,694 | Ross | Nov. 15, 1955 |

FOREIGN PATENTS

| | | |
|---|---|---|
| 874,128 | Germany | Nov. 8, 1954 |

OTHER REFERENCES

Ser. No. 360,381, Hilgers (A.P.C.) published May 11, 1943.